United States Patent Office 3,514,156
Patented May 26, 1970

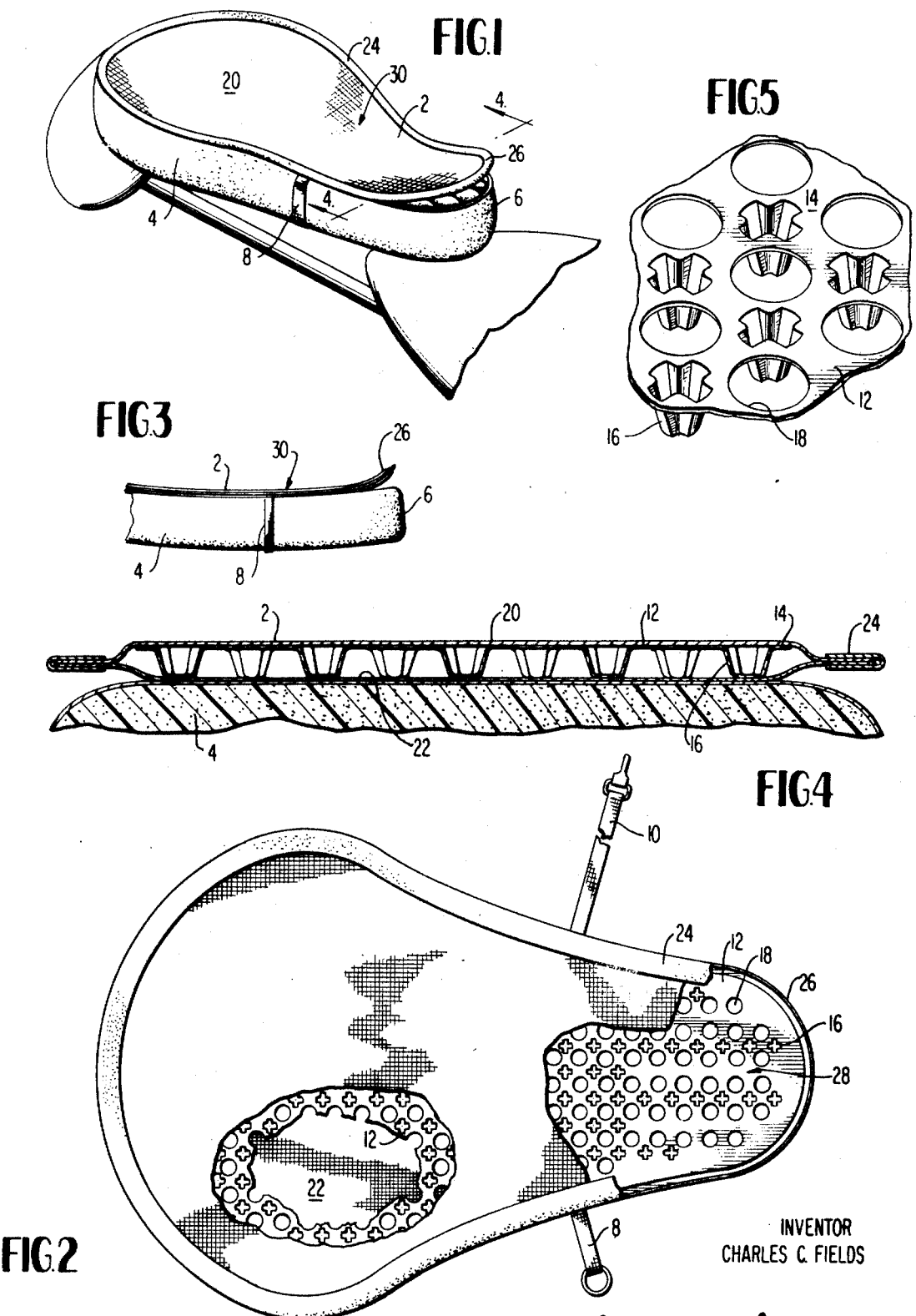

3,514,156
VENTILATING SEAT PAD FOR MOTORCYCLES
Charles C. Fields, 4924 Morwanda St. NW.,
Roanoke, Va. 24017
Filed Apr. 15, 1969, Ser. No. 816,299
Int. Cl. A47c 27/14, 21/04
U.S. Cl. 297—453         3 Claims

ABSTRACT OF THE DISCLOSURE

A pear-shape seat pad is formed of top and bottom cover sheets of foraminous fabric with a dimpled and perforate core of springy sheet material sandwiched therebetween. A strap for securing the pad over a motorcycle seat is disposed rearwardly of the front or smaller end of the pad so that the smaller end, which projects forwardly of the crotch of a rider, flexes upwardly and forms an air scoop.

BACKGROUND OF THE INVENTION

Field

Chairs and seats, bottom or back, ventilating means spaced from subjacent support.

Prior art

Trotman 3,162,488 which discloses a generally rectangular auto seat pad formed of cover and core material of the type usable for the subject invention; Hughes Des. 137,051, which discloses a saddle seat cover with mounting straps, but without the ventilating feature provided by the subject invention.

OBJECTS

The object of this invention is to provide a seat pad for motorcycles which will not only be a springy support for the rider, but which will also ensure that a positive draft of air will be forced through the pad and against the underside of a rider seated thereon.

Ventilating pads for automobile seats have been widely used, but these are usually rectangular pads which rest flatly on the seat, and there is no provision for scooping up and channeling whatever air may be flowing in or through the automobile, which is generally of low velocity. However, with a motorcycle, a considerable volume of air flown at high velocity past the rider, and an appreciable amount of this is directed towards the front end of the seat, which is usually smaller than the rear portion, and which usually projects a short distance forwardly of the crotch of a rider normally seated thereon. The object now is to take advantage of this phenomenon and this circumstance by providing an open-work seat pad through which air flows freely, both edgewise and normally to the flat surfaces, and which has an upwardly flexed tongue at its forward end for scooping air from the fast-flowing stream and directing it beneath and onto the underside of the rider.

These and other objects will be apparent from the following specification and drawing, in which:

FIG. 1 is a perspective view of the seat pad attached to a motorcycle seat;

FIG. 2 is a plan view of the seat pad unattached and partly broken away;

FIG. 3 is a fragmentary side elevation of the seat pad as shown in FIG. 1;

FIG. 4 is a cross-section of the seat pad taken along the line 4—4 of FIG. 1; and FIG. 5 is a perspective view of a fragment of the core material.

Referring now to the drawing, in which like reference numerals denote similar elements, the ventilating seat pad 2 which is the subject of this invention is shown (FIGS. 1, 3 and 4) as it is used on a motorcycle seat 4 typically having a front end 6 which is the smallest or narrowest part. It will be understood that when a rider straddles the seat, the smaller end 6 projects forwardly of his crotch. Seat pad 2 is secured over seat 4 by means of straps 8, 10 which are drawn tightly around and under seat 4 well to the rear of its front end 6. Seat pad 2 is generally pear-shape, and straps 8, 10 are set well back of what would be the smaller end of the pear, for reasons explained hereinafter.

Seat pad 2 is formed of what may be called "open work" materials in that they are characterized by openings and passages which permit air to flow freely therethrough. While various types of these materials which are well known in the ventilating seat art may be used, a preferred form of the invention utilizes a core sheet of the type disclosed in the patent to Trotman 3,162,488. Such a sheet is formed of thin plastic, somewhat springy material having a flat planar surface portion 14 interspaced with rows of molded frusto-conical and somewhat cruciform dimples 16. The dimples 16 have sufficient structural strength in aggregate to provide ample support for the rider. Between the dimples are perforations 18 so that air can flow freely edgewise of the material between the rows of dimples 16, and also normally of the sheet through the perforations 18 in the flat planar portion 14. Top and bottom covers 20 and 22 of foraminous fabric sandwich core sheet 14 therebetween, and an edge binding 24 is suitably secured over the peripheral edges of the covers. If desired, flat and un-dimpled flat marginal edge portions of the core piece may be extended outwardly sufficiently to be embraced between the edgebound portions of the top and bottom covers. As a further refinement, some of the dimples 16 may be omitted from the front end of the core, as denoted generally at 28, since this portion of the pad does not support the rider and all of them are not needed for their aggregate strength. Omission of some of the dimples in this region enhances air flow primarily edgewise of the pad.

In operation, when pad 2 is tightly secured onto seat 4 by straps 8, they (the straps) create tension across the pad in the region generally denoted by the arrow 30, and this causes the front end 26 of the pad to flex upwardly, like a tongue. The weight of the rider further enhances this upward flexing of the front end 26 of the pad, so that it functions as a scoop for the air stream impinging thereon. The air impinging against the front end of pad 2 flows freely edgewise of core 14 between dimples 16, through perforations 18, and through the foraminous fabric covers 20, 22 so as to ventilate and cool the underside of the rider.

I claim:

1. A ventilating pad for motorcycle seats comprising a generally pear-shape assembly having
   a flexible core with air passage means therethrough,
   and top and bottom covers of foraminous flexible fabric secured over and under the core, said pad having a forward end portion substantially narrower in width than the rear end thereof,
   and strap means extending from opposite side edges of the pad at opposite points which are spaced rearwardly of the front end of the pad, the portion of said pad which lies forwardly of said strap means being free and devoid of any means for attaching the same to a seat, whereby when said strap means are secured tightly around and beneath the motorcycle seat, a line of tension is imposed across the pad, whereby tending to flex the forward end portion of said pad upwardly in front of the crotch of a rider seated on said pad, said core comprising a generally flat planar sheet of molded plastic material, said air passage means being formed by spaced rows of generally frusto-conical concavo-convex dimples extending downwardly from said sheet, and perforations through the sheet, which perforations are disposed between the dimples.

2. A ventilating pad as recited in claim 1, certain of said rows of dimples extending to adjacent the forward end of the pad, and others of said rows of dimples terminating rearwardly of the forward end of the pad, whereby the air passage means between rows of dimples are wider at the front end portion of the core than at the rear end portion thereof.

3. A ventilating pad for motorcycle seats, said pad comprising an elongate body of greater length than width adapted to overlie a motorcycle seat with the longest dimension of the body extending in the fore-and-aft direction of the seat, said body having a flexible core with air passage means therethrough,
top and bottom covers of foraminous flexible fabric secured over and under said core, and strap means extending from opposite side edges of the pad at opposite points which are spaced rearwardly of the front end of the pad, the portion of said pad which lies forwardly of said strap means being free and devoid of any means for attaching the same to the seat, said strap means, when secured tightly around and beneath a motorcycle seat, imposing a line of tension across said pad and flexing the portion of said pad which lies forwardly thereof upwardly in front of the crotch of a rider seated on that portion of the pad which lies rearwardly of the pad, said core comprising a generally flat planar sheet of molded plastic material, said air passage means being formed by spaced rows of generally frusto-conical dimples extending downwardly from said sheet, and perforations through said sheet which perforations are disposed between the dimples, certain of said rows of dimples extending adjacent the forward end of the pad, and others of said rows of dimples terminating rearwardly of the forward end of the pad, whereby said air passage means between said rows of dimples are wider at the front end of the core than at the rear end portion thereof.

References Cited
UNITED STATES PATENTS 1,322,959 11/1919 Sawasaki _____ 297—214
3,162,488 12/1964 Trotman _____ 297—453

CASMIR A. NUNBERG, Primary Examiner

U.S. Cl. X.R.

5—347; 297—195